United States Patent Office … 3,835,115
Patented Sept. 10, 1974

3,835,115
α-(SUBSTITUTED SULFONAMIDO)ARYL-METHYLPENICILLINS

Kenneth Richardson, North Stonington, Conn., assignor to Pfizer Inc., New York, N.Y.
No Drawing. Filed July 17, 1972, Ser. No. 272,171
Int. Cl. C07d 99/16
U.S. Cl. 260—239.1
7 Claims

ABSTRACT OF THE DISCLOSURE

Compounds of the formula:

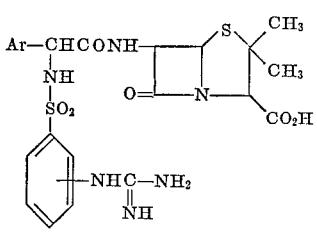

or the pharmaceutically acceptable basic salts thereof, wherein Ar is phenyl, 4-hydroxyphenyl or thienyl as antimicrobial agents.

BACKGROUND OF THE INVENTION

The invention relates to a series of penicillins and in particular to 6 - [2-aryl-2-(guanidinophenylsulfonamido)acetamido]penicillanic acids and to the pharmaceutically acceptable basic salts thereof, possesssing antibacterical activity against gram-negative micro-organisms, especially those of the genus *Pseudomonas*.

The compounds in the group belonging to the family of penicillins differ from each other in the nature of the R variable and possess the general formula indicated below wherein the acyl moiety on the 6-aminopenicillanic acid

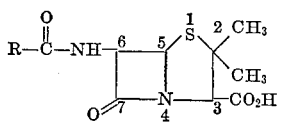

is derived from a carboxylic acid or functional derivative thereof, such as an acyl halide or anhydride.

The pharmacodynamic properties and antibiotic profile of a given penicillin are determined to a great extent by the nature of the R group. The most widely used penicillins are those wherein the R moiety is represented by benzyl-, phenoxymethtyl- or α-phenoxyethyl-. While these well-known analogs are highly antagonistic toward gram-positive micro-organisms, they have limited gram-negative activity. Consequently, drugs which will combat the rise in gram-negative infections are of value to the medical profession.

Efforts to improve the profile of activity within the family of penicillins has resulted in the synthesis of several new agents. 6-(α-Sulfoaminoarylacetamido)pencillanic acids (U.S. Pat. 3,381,001) are claimed to be antimicrobial agents particularly useful in the treatment of *Pseudomonas* infections, while a series of 6-(α-substituted - sulfonamido - phenylacetamido)penicillanic acids (U.S. Pat. 3,471,474) are reported to be of value as antibacterial agents, nutritional supplements in animal feeds and as agents for the treatment of mastitis in cattle. Similar 6 - (α - substituted-sulfonylamino- and sulfenamido-phenylacetamido)penicillanic acids are disclosed in British Pats. 1,140,975 and 1,134,237.

SUMMARY OF THE INVENTION

It has now been found that a series of synthetic penicillins represented by the formula

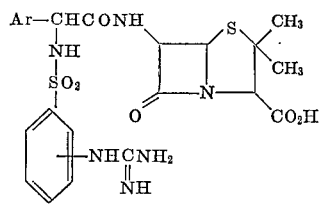

and the pharmaceutically acceptable basic salts thereof, wherein Ar is phenyl, 4-hydroxyphenyl or thienyl are antimicrobial agents, especially against those of the genus *Pseudomonas*.

A preferred group of congeners are those wherein Ar is phenyl or 2-thienyl.

As one skilled in the art can readily appreciate, the α-carbon atom of the penicillin side chain to which the guanylphenylsulfonamido moiety is attached is an asymmetric carbon atom allowing for the existence of two optically active isomers, the D- and L-diastereoisomers, as well as the racemate, DL mixture. In accordance with previous findings concerning the activity of such penicillins possessing an asymmetric α-carbon atom, the compounds of the present invention having the D-configuration are more active than those of the L-configuration and are the preferred compounds, although the L and DL-forms of the instant compounds are also considered within the purview of the present invention.

It is noteworthy to mention while considering asymmetric centers, that there are several in the 6-aminopenicillanic acid nucleus, the basic building block from which the compounds of the instant invention are derived. These potential additional isomers are not significant in this instance since the 6-aminopenicillanic acid employed as the starting material is that which is produced by fermentation and is consistently of one configuration.

Also considered within the scope of the istant invention are congeners of the claimed compounds wherein the nitrogens of the guanidino moiety are substituted by one or more members of the group comprised of alkyl, alkenyl, aralkyl and aryl.

DETAILED DESCRIPTION OF THE INVENTION

In accordance with the process employed for synthesizing the penicillins of the present invention, the following scheme is illustrative:

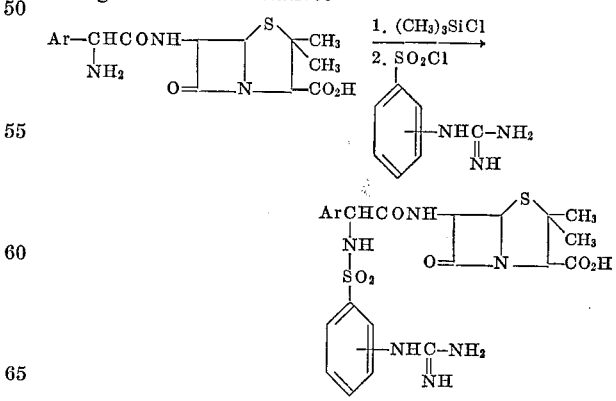

In practice, the requisite α-aminoarylmethylpenicillin triethylamine salt, wherein Ar is as previously indicated, is converted to its trimethylsilyl ester employing trimethylsilyl chloride and tertiary amine such as triethylamine (TEA). The reaction is conveniently carried out in a low boiling, reaction-inert solvent such as methylene chloride.

The molar ratio of reactants, penicillin, silyl chloride and TEA, are, respectively, 1:2:4. The most favorable order of contacting these starting materials is the addition of the TEA to the penicillin in methylene chloride, followed by the addition of the silyl chloride. For this aspect of the preparative scheme a reaction time of 20–30 min. at ambient temperatures is preferred.

Following the preparation of the silyl ester, the solvent is removed under reduced pressure and the residual material treated with a highly polar, aprotic solvent such as dimethylformamide or hexamethylphosphoramide. The reaction mixture is cooled in an ice-salt bath and the appropriate sulfonyl chloride is then added. After completion of the reaction, requiring 1–3 hrs., the solvent is partially removed *in vacuo*, and the remaining portion added to methylene chloride. The solids are filtered and dried.

The starting reagents leading to the products of the present invention are easily prepared by methods familiar to those skilled in the art. The α-aminoarylmethylpenicillins are known and described in U.S. Pats. 2,985,648 and 3,342,677 and Long *et al., J. Chem. Soc.,* 1920 (1971), while the guanidinophenylsulfonic acids, prepared by the method of Ville *et al., Comptes rendus, 104,* 1281, are converted to the corresponding sulfonyl chlorides employing phosphorous pentachloride - phosphorous oxychloride.

As one skilled in the art can recognize, the guanidino moiety of the instantly claimed compounds can exist in several different tautomeric forms, all of which are considered within the purview of the present invention.

As has been previously noted, a characteristic feature of the acidic compounds of the instant invention is their ability to form basic salts. Acid congeners of the present invention are converted to basic salts by the interaction of said acid with an appropriate base in an aqueous or nonaqueous medium. Such basic reagents suitably employed in the preparation of said salts can vary in nature, and are meant to contemplate such bases as alkali metal hydroxides, hydrides and alkoxides, as well as alkali earth metal hydroxides, hydrides and alkoxides. Representative of such bases are sodium hydroxide, potassium hydroxide, sodium ethoxide, potassium methoxide, magnesium hydroxide, calcium hydride and barium hydroxide.

As one skilled in the art can readily appreciate, the compounds of the instant invention are sufficiently basic, by virtue of the guanidine moiety, to form acid addition salts; said salts, especially the pharmaceutically acceptable acid addition salts, are also considered within the scope of this invention.

In the utilization of the chemotherapeutic activity of those compounds of the present invention which form basic salts, it is preferred, of course, to use pharmaceutically acceptable salts. Although water insolubility, high toxicity, or lack of crystalline nature may make some salt species unsuitable or less desirable for use as such in a given pharmaceutical application, the water insoluble or toxic salts can be converted to the corresponding acids by decomposition of the salts as described above, or alternately they can be converted to any desired pharmaceutically acceptable basic salt. The said pharmaceutically acceptable salts preferred include the sodium, aluminum, potassium, calcium and magnesium.

The novel penicillins described herein exhibit *in vitro* activity against a wide variety of micro-organisms, including both gram-positive and gram-negative bacteria. Their useful activity can readily be demonstrated by *in vitro* tests against various organisms in a brain-heart infusion medium by the usual two-fold serial dilution technique. The *in vitro* activity of the herein described compounds renders them useful for topical application in the form of ointments, creams and the like, or for sterilization purposes, e.g., sick-room utensils.

These novel penicillins are also effective antibacterial agents *in vivo* in animals, including man, especially *via* the parenteral route of administration.

Obviously, the physician will ultimately determine the dosage which will be most suitable for a particular individual person, and it will vary with the age, weight and response of the particular patient as well as with the nature and extent of the symptoms, the nature of the bacterial infection being treated and the pharmacodynamic characteristics of the particular agent to be administered. It will often be found that when the composition is administered orally, larger quantities of the active ingredient will be required to produce the same level as produced by a smaller quantity administered parenterally.

Having full regard for the foregoing factors it is considered that an effective daily oral dose of the compounds of the present invention in humans of approximately 100–1000 mg./kg. per day, with a preferred range of about 500–750 mg./kg. per day in divided doses, and a parenteral dose of 250–1000 mg./kg. per day, with a preferred range of about 250–750 mg./kg. per day in divided doses will effectively alleviate the symptoms of the infection. These values are illustrative, and there may, of course, be individual cases where higher or lower dose ranges are merited.

As has been previously mentioned, the penicillins of the present invention are broad spectrum antibiotics which are, unlike many penicillin analogs, antagonistic toward gram-negative micro-organisms, in particular *Pseudomonas*.

The preferred compounds of the present invention are

6-[2-phenyl-2-(*p*-guanidinophenylsulfonamido) acetamido]penicillanic acid,

6-[2-phenyl-2-(*m*-guanidinophenylsulfonamido) acetamido]penicillanic acid,

6-[2-{2-thienyl}-2-(*p*-guanidinophenylsulfonamido) acetamido]penicillanic acid, and 6-[2-{2-thienyl}-2-(*m*-guanidinophenylsulfonamido) acetamido]penicillanic acid.

Further preferred within this group of outstanding compounds are those disastereoisomers of the D-configuration.

The novel products of this invention are of value as antibacterial agents and are remarkably effective in treating a number of infections caused by susceptible gram-negative and gram-positive bacteria in poultry and animals including man. For such purposes, the pure materials or mixtures thereof with other antibiotics can be employed. They may be administered alone or in combination with a pharmaceutical carrier on the basis of the chosen route of administration and standard pharmaceutical practice. For example, they may be administered orally in the form of tablets containing such excipients as starch, milk sugar, certain types of clay, etc., or in capsules alone or in admixture with the same or equivalent excipients. They may also be administered orally in the form of elixirs or oral suspensions which may contain flavoring or coloring agents, or be injected parenterally, that is, intramuscularly or subcutaneously. For parenteral administration, they are best used in the form of a sterile aqueous solution which may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are nontoxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

The following examples are provided solely for the purpose of illustration and are not to be construed as limitations of this invention, many variations of which are possible without departing from the spirit or scope thereof.

EXAMPLE 1

6-[D-2-Phenyl-2-(m-guanidinophenylsulfonamido)acetamido]penicillanic acid

To a solution of D-α-aminobenzylpenicillin triethylamine salt (3.38 g., 7.5 mmoles) in 30 ml. of methylene chloride is added trimethylsilyl chloride (1.9 ml., 15 mmoles) followed by triethylamine (4.2 ml., 30 mmoles), and the resulting reaction mixture allowed to stir for 20 min. The solvent is removed under reduced pressure, and the residual material treated with 50 ml. of dry dimethylformamide and cooled in a salt-ice bath to —5–0° C. While maintaining stirring, m-guanidinophenylsulfonyl chloride hydrochloride, prepared from 2.15 g. (10 mmoles) of the corresponding sulfonic acid, in 10 ml. of dimethylformamide is added dropwise. After one hour the reaction mixture is concentrated in vacuo to ~30 ml. and added dropwise to 400 ml. of methylene chloride. The resulting suspension, after stirring for 20 min., is filtered, and the precipitate washed several times with methylene chloride, giving the final product, 1.6 g.

Infrared spectrum peaks (microns, Nujol) 5.63, 5.9, 6.0, 6.55, 7.5, 7.7, 8.7.

The in vitro minimum inhibitory concentration (MIC) in mcig./ml. against Ps. aeruginosa 52A490 is 6.25.

EXAMPLE 2

6-[D-2-Phenyl-2-(p-guanidinophenylsulfonamido)acetamido]penicillanic acid

Starting with 4.5 g. (0.01 mole) of D-α-aminobenzylpenicillin triethylamine salt, 2.2 ml. (0.02 mole) of trimethylsilyl chloride, 4.0 g. (0.04 mole) of triethylamine and p-guanidinophenylsulfonyl chloride hydrochloride, prepared from 2.63 g. (0.012 mole) of p-guanidinophenylsulfonic acid, and repeating the procedure of Example 1, provides 1.88 g. of the desired product.

Infrared spectrum peaks: (microns; Nujol) 5.6, 5.9, 6.0, 6.7, 7.5, 7.7, 8.2, 8.6.

The in vitro minimum inhibitory concentration (MIC) in mcg./ml. against Ps. areuginosa 52A490 is 50.

EXAMPLE 3

The procedure of Example 1 is again repeated, employing the appropriate starting reagents, to prepare the following congeners:

6-[DL-2-hydroxyphenyl-2-(o-guanidinophenylsulfonamico)acetamido]penicillanic acid,
6-[D-2-p-hydroxyphenyl-2-(p-guanidinophenylsulfonamido)acetamido]penicillanic acid,
6-[L-2-phenyl-2-(o-guanidinophenylsulfonamido)acetamido]penicillanic acid, and
6-[D-2-p-hydroxyphenyl-2-(m-guanidinophenylsulfonamido)acetamido]penicillanic acid.

EXAMPLE 4

6-[DL-2-{2-Thienyl}-2-(p-guanidinophenylsulfonamido)aectamido]penicillanic acid

Trimethylsilyl chloride (3.8 ml., 0.03 mole) is added to a solution of 6.8 g. of (0.015 mole) of DL-α-amino-2-thienylmethylpenicillin triethylamine salt in 65 ml. of methylene chloride, followed by the addition of 6.06 g. (0.06 mole) of triethylamine, and the reaction mixture allowed to stir at room temperature for 35 min. The methylene chloride is removed under reduced pressure, and the residual intermediate silyl ester and triethylamine dissolved in 110 ml. of dry dimethylformamide and cooled to —25° C. in an acetone-Dry Ice bath. p-Guanidinophenylsulfonyl cholride, prepared from 4.30 g. (0.02 mole) of p-guanidinophenylsulfonic acid, dissolved in 25 ml. of dry dimethylformamide is added dropwise to the cold silyl ester solution. The resulting reaction mixture is allowed to stir in the cold for 1.5 hrs., after which the solvent is concentrated in vacuo to ~50 ml. and added dropwise to 800 ml. of well-stirred methylene chloride. Stirring is maintained for 30 min., and the resulting suspension is filtered, and the solid dried in vacuo to provide the final product.

EXAMPLE 5

Employing the procedure of Example 4, and starting with the requisite starting reagents, the following penicillins are synthesized:

6-[D-2-{2-thienyl}-2-(m-guanidinophenylsulfonamido)acetamido]penicillanic acid,
6-[L-2-{2-thienyl}-2-(o-guanidinophenylsulfonamido)acetamido]penicillanic acid,
6-[D-2-{3-thienyl}-2-(p-guanidinophenylsulfonamido)acetamido]penicillanic acid, and
6-[DL-2-{3-thienyl}-2-(m-guanidinophenylsulfonamido)acetamido]penicillanic acid.

EXAMPLE 6

6-[D-2-Phenyl-2-(p-guanidinophenylsulfonamido)acetamido]penicillanic acid sodium salt To a slurry of 5.46 g. (0.01 mole) of 6-[D-2-phenyl-2-(p - guanidinophenylsulfonamido)acetamido]penicillanic acid in 20 ml. of dioxane and 10 ml. of water (cold) is added 400 mg. (0.01 mole) of sodium hydroxide dissolved in 10 ml. of water. The hazy solution is allowed to stir for 10 min., and is then filtered. The filtrate is freeze-dried, and the residual product triturated with chloroform, filtered and dried in vacuo.

In an analogous manner, the corresponding potassium, calcium, magnesium and other pharmaceutically acceptable metal salts of 6-[D-2-phenyl-2-(p-guandinophenylsulfonamido)acetamido]penicillanic acid and the herein described penicillins are prepared.

PREPARATION A

Guanidinophenylsulfonyl Chlorides 1. m-Guanidinophenylsulfonyl chloride.—A mixture of 2.15 g. (0.01 mole) of m-guanidinophenylsulfonic acid, 2.28 g. (0.011 mole) of phosphorous pentachloride and 3.06 g. (0.02 mole) of phosphorus oxychloride is heated on a steam bath at 90° C. overnight. The phosphorus oxychloride is removed in vacuo, and the residual product is washed several times with methylene chloride. The product, a clear oil, is used without further purification.

2. o- and p-Guanidinophenylsulfonic acids, also prepared by the procedure as taught by Ville et al., Comptes rendus, 104, 1281, are reacted in a similar manner with a mixture of phosphorous pentachloride and phosphorous oxychloride to yield the corresponding sulfonyl chlorides which are employed as intermediates in the synthesis of the instantly claimed compounds.

What is claimed is:

1. A compound selected from those of the formula

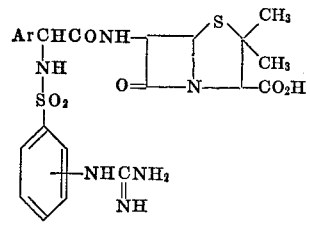

and the pharmaceutically acceptable basic salts thereof, wherein Ar is selected from the group consisting of phenyl, 4-hydroxyphenyl and thienyl.

2. A compound of claim 1 wherein Ar is phenyl.

3. The compound of claim 2 in which the compound is 6-[2-phenyl-2 - (p - guanidinophenylsulfonamido)acetamido]penicillanic acid.

4. The compound of claim 2 in which the compound is 6-[2-phenyl-2-(m - guanidinophenylsulfonamido)acetamido]penicillanic acid.

5. A compound of claim 1 wherein Ar is thienyl.

6. The compound of claim 5 in which the compound is 6-[2-{2-thienyl}-2-(p - guanidinophenylsulfonamido)acetamido]penicillanic acid.

7. The compound of claim 5 in which the compound is 6-[2-{2-thienyl}-2-(m - guanidinophenylsulfonamido)acetamido)penicillanic acid.

References Cited

UNITED STATES PATENTS

| 3,406,185 | 10/1968 | Patchett et al. | 260—239.1 |
| 3,454,557 | 7/1969 | Patchett et al. | 260—239.1 |
| 3,471,474 | 10/1969 | Ekström et al. | 260—239.1 |
| 3,453,265 | 7/1969 | Patchett et al. | 260—239.1 |
| 3,479,401 | 11/1969 | Patchett et al. | 260—239.1 |
| 3,654,265 | 4/1972 | Essery et al. | 260—239.1 |

NICHOLAS S. RIZZO, Primary Examiner

U.S. Cl. X.R.

424—271